United States Patent [19]

Hamanishi

[11] Patent Number: 4,514,051
[45] Date of Patent: Apr. 30, 1985

[54] REAR CONVERSION LENS

[75] Inventor: Yoshinari Hamanishi, Tokyo, Japan

[73] Assignee: Nippon Kogaku K. K., Tokyo, Japan

[21] Appl. No.: 641,361

[22] Filed: Aug. 15, 1984

Related U.S. Application Data

[63] Continuation of Ser. No. 422,950, Sep. 24, 1982, abandoned.

[30] Foreign Application Priority Data

Jan. 20, 1982 [JP] Japan .................................. 57-6079

[51] Int. Cl.³ .............................................. G02B 13/02
[52] U.S. Cl. ...................................... 350/465; 350/454
[58] Field of Search ......................... 350/454, 455, 465

[56] References Cited

U.S. PATENT DOCUMENTS 4,154,508  5/1979  Nakamura ........................... 350/465
4,206,971  6/1980  Hamanishi et al. ................. 350/183

Primary Examiner—John K. Corbin
Assistant Examiner—Paul M. Dzierzynski
Attorney, Agent, or Firm—Shapiro and Shapiro

[57] ABSTRACT

A rear conversion lens for a single lens reflex camera, constructed with a front lens group including a positive lens with its surface having a greater curvature facing to the image side, a negative biconcave lens, and a positive lens with its surface having a greater curvature facing to the object side, and a rear lens group including a negative lens, the rear conversion lens being provided between an objective lens and a camera body to extend a composite focal length, and satisfying certain conditions.

11 Claims, 8 Drawing Figures

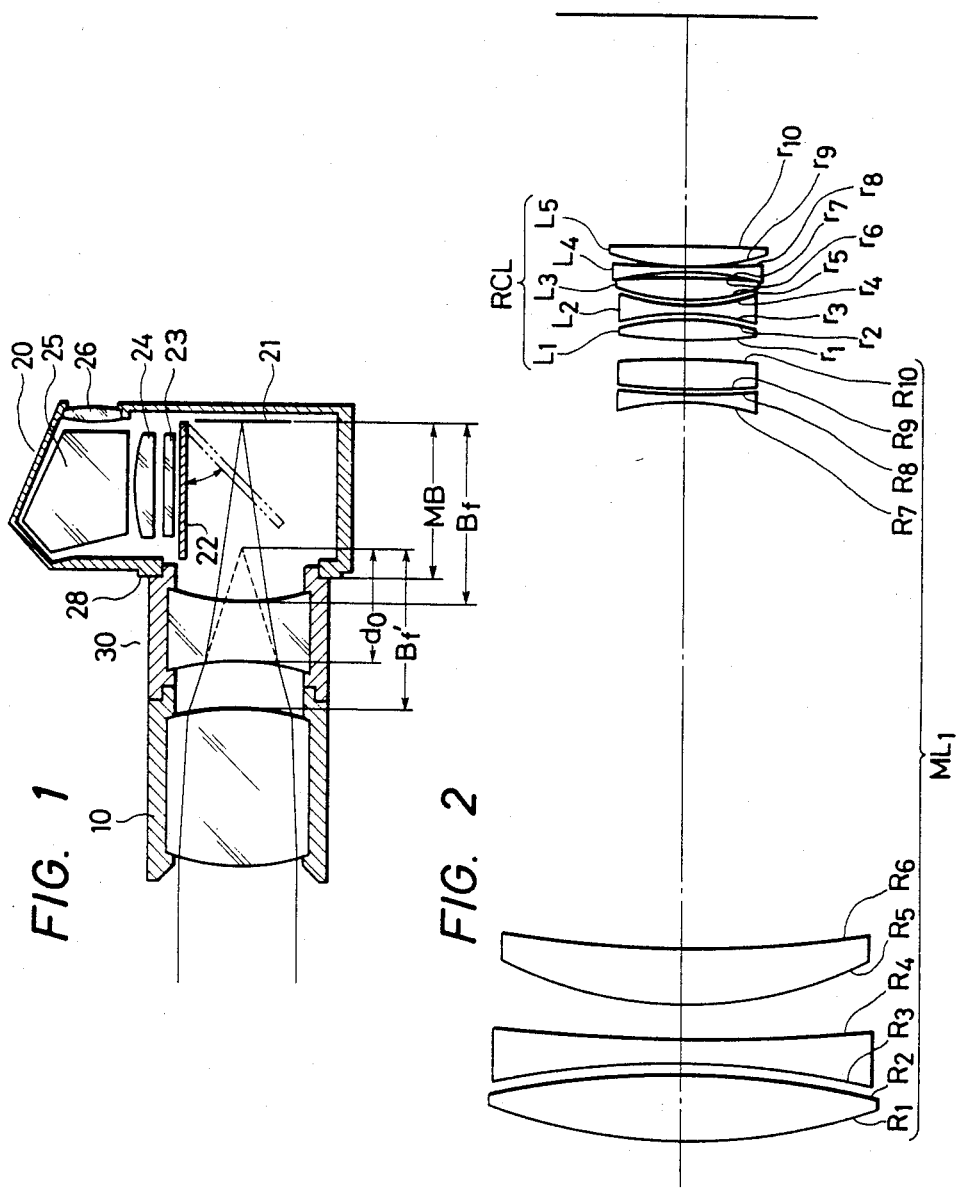

REAR CONVERSION LENS

This application is a continuation application of Ser. No. 422,950, filed Sept. 24, 1982, now abandoned.

BACKGROUND OF THE INVENTION

1. Field of the Invention

This invention relates to a photographic lens, and, more particularly, it is concerned with a rear conversion lens of a highly compact type, which is mounted on the photographic lens to the side of a photographic image, thereby extending the focal length of the lens system.

2. Description of the Prior Art

Various kinds of rear conversion lens (hereinafter referred to as "RCL") have been put into practical use. However, the RCL which is mountable on a photographic lens has been all limited to those having a long back focus. The RCL for a single lens reflex camera, when its magnification is made constant, varies its lens performance to a significant extent depending on the back focus length, the position of the exit pupil, and further the F-number of the objective lens. On account of this, changes in the standard of the objective lens to be mounted on the RCL affect the lens structure of the RCL.

FIG. 1 of the accompanying drawing illustrates a schematic construction, wherein an RCL 30 is interposed between an objective lens 10 and a body 20 of the single lens reflex camera. The illustration includes a marginal ray extending from an infinite object point on the optical axis and reaching a film surface 21. The body 20 of the single lens reflex camera contains therein an oscillatable reflection mirror 22, a reticle 23, a condenser lens 24, a pentagonal Dach (roof) prism 25, and an ocular lens 26. The reflection mirror 22 is usually at an oblique position as shown by a dotted line, when no exposure is to be performed on the film surface 21. In order to secure a space for oscillation of this oscillatable reflection mirror 22 in the single lens reflex camera, a distance between a lens mounting plane 28 and the film plane 21 in the camera body 20, i.e., the so-called "flange back (MB)" is predetermined to a fixed value. On the other hand, a distance between the surface of the rearmost lens in the objective lens and its focal point, i.e., a back focus (B$_f$) is designed to be sufficiently longer than the oscillating space for the reflection mirror 22. As the consequence of this, the back focus (B$_f$) of a composite system comprising the objective lens and the RCL mounted on the objective lens should be maintained greater than the oscillating space for the reflecting mirror.

In the RCL having a magnification ranging from 1.4 to 1.5 or so, and mounted on a lens for a single lens reflex camera with a large aperture ratio, if the exit pupil of the objective lens, on which the RCL is mounted, is at a relatively distant position, the effective aperture of each lens constituting the RCL becomes inevitably large because the marginal ray reaching the end part of the image plane passes through a location away from the optical axis. From the standpoint of correcting the aberrations, an optical system, which is durable for use under a bright circumstance, is also required. Since the magnification of the RCL is only 1.4 to 1.5 or so, as mentioned above, when it is mounted on an objective lens having a short back focus, there is great difficulty in securing sufficient back focus of the lens for a single lens reflex camera after mounting of the RCL. With a view to solving these difficulties, there may be contemplated methods of reducing the center thickness of each lens component in the RCL, reducing an aerial interspace among the lens components, and decreasing the number of lens components for the lens structure to thereby reduce the total lens thickness of the RCL as far as possible. In so doing, it is possible to secure the sufficient back focus, but freedom in correction of the aberrations is sacrificed, with the consequent difficulties in obtaining a lens system having a large aperture ratio and a high lens performance.

SUMMARY OF THE INVENTION

It is therefore an object of the present invention to provide an RCL having a magnification of from 1.4 to 1.5 or so and capable of maintaining excellent image forming capability, even if it is mounted on an objective lens having a relatively short back focus and a large aperture ratio, the exit pupil of which is at a relatively distant position from the image plane.

With a view to achieving the above-mentioned purposes, the rear conversion lens for single lens reflex camera according to the present invention, which is to be interposed between an objective lens and a body of the single lens reflex camera to extend a composite focal length, is constructed with a front lens group (lens unit) including a positive lens L$_1$ with its surface having a greater curvature facing to an image side, a biconcave negative lens L$_2$, and a positive lens L$_3$ with its surface having a greater curvature facing to an object side and a rear lens group (lens unit) including a negative lens L$_4$, the lens groups being arranged in the mentioned sequence from the object side, the rear conversion lens being so constructed as to satisfying the following conditions:

$$0.1 < \frac{\Sigma_d}{-f_R} < 0.2 \qquad (1)$$

$$0.95 < \frac{B_f}{-d_0} < 1.2 \qquad (2)$$

(where: $\Sigma_d$ is a distance between the frontmost lens surface and the rearmost lens surface of the rear conversion lens; $f_R$ is a focal length of the rear conversion lens; $B_f$ denotes a back focus when the rear conversion lens is mounted on the objective lens; and $d_0$ represents a distance between the frontmost lens surface of the rear conversion lens and the rear focal point of the objective lens to be mounted on the rear conversion lens).

The foregoing object, other objects, as well as specific construction and function of the rear conversion lens according to the present invention will become more apparent and understandable from the following detailed description thereof taken in conjunction with the accompanying drawings.

BRIEF DESCRIPTION OF THE DRAWINGS

In the drawings:

FIG. 1 is a longitudinal cross-section showing a schematic construction in which an RCL is interposed between an objective lens and a body of a single lens reflex camera;

FIG. 2 is a layout of the lens components when the first embodiment of the RCL according to the present invention is mounted on the first reference lens;

DETAILED DESCRIPTION OF THE PREFERRED EMBODIMENTS

Figure 3:
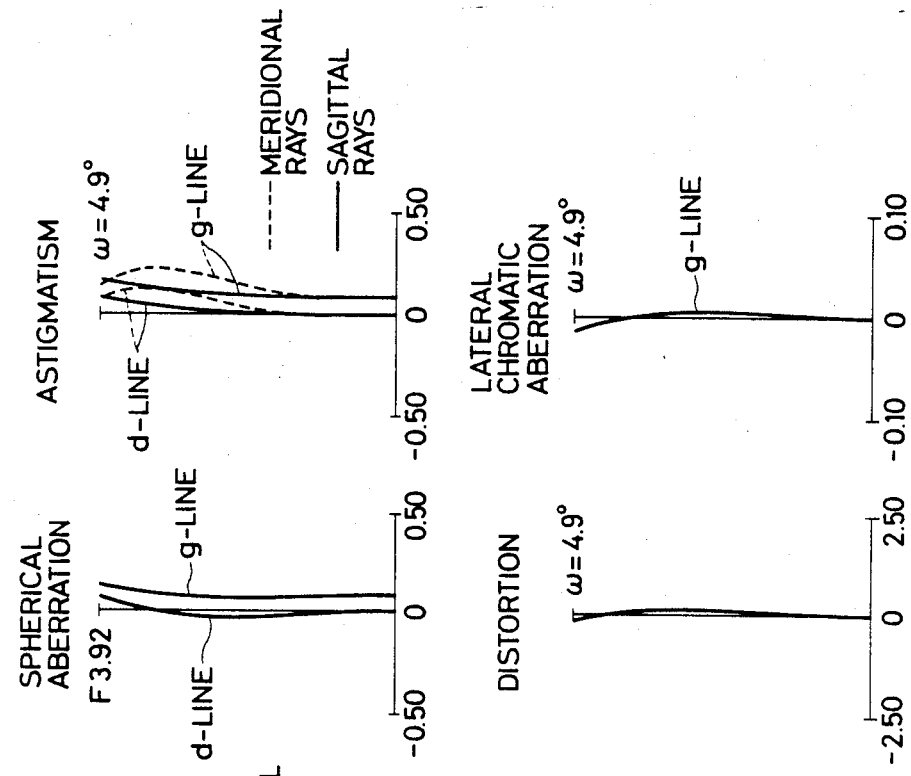
FIGS. 3 and 4 are respectively aberration diagrams when the first and second embodiments of RCL are provided on the first reference lens.

In the following, the present invention will be described in detail in reference to preferred embodiments illustrated in the accompanying drawing.

The above conditional expression (1) is for defining compactness of the RCL. In this expression, when the upper limit is exceeded, aberrations can be corrected easily, but the RCL becomes inevitably long in its total length. On account of this, the principal point of the RCL intrudes significantly into the RCL interior, which makes it impossible to secure the sufficient aerial interspace at the junction between the RCL and the objective lens, or to secure sufficient back focus. Further, since the negative refractive power of the RCL becomes large, the Petzval sum deviates excessively to the negative side to result in a large astigmatic difference. If the lower limit of the expression (1) is exceeded, the lens thickness in the lens system becomes excessively small, whereby freedom in correcting the aberrations decreases; in particular, correction of the annular spherical aberration and the astigmatic difference becomes very difficult. In addition, it is difficult to transmit a sufficient amount of the marginal light ray of the objective lens having a far exit pupil, with the consequent shortage in the amount of the marginal light ray.

The conditional expression (2) is for securing versatility of RCL, i.e., the one that provides a sufficient back focus even when the RCL is provided on an objective lens having only a short back focus under the restriction as defined by the conditional expression (1). When the upper limit of the expression (2) is exceeded, the central light ray and the marginal light ray pass through the RCL at substantially different heights, with the consequence that both spherical aberration and astigmatic aberration are difficult to be correct simultaneously. As for the objective lens having a far exit pupil, the effective aperture thereof should be made large for securing sufficient marginal light ray. When the aperture is increased, the thickness at the center part of the lens component should be made much thicker, which results in exceeding the upper limit defined by the above expression (1) and difficulty in attaining the expected performance of the lens components. When the lower limit defined by the expression (2) is exceeded, the RCL cannot be mounted on the objective lens having a short back focus with the result that versatility of the RCL is significantly reduced.

In the basic construction of the present invention as mentioned above, it is desirable for the RCL for the single lens reflex camera to be so constructed that a distance from the lens mounting plane to the film surface in the body of the single lens reflex camera, i.e., the flange back, be in the following relationship:

$$0.25 < \frac{\Sigma_d}{MB} < 0.41 \qquad (3)$$

(where: $\Sigma_d$ denotes a distance between the frontmost surface and the rearmost surface in the RCL; and MB represents the flange back).

When the lower limit of the above conditional expression (3) is exceeded, it becomes difficult to secure the sufficient back focus required for the single lens reflex camera, since the lens magnification in use is as low as 1.4 to 1.5 or so, and this is not desirable.

In general, since the RCL is at a position substantially distant from the aperture diaphragm, the aberration of the light rays outside the optical axis can be corrected relatively easily, but correction of the light rays on the optical axis is very difficult. On account of this, it is desirable that, in order to correct the annular spherical aberration to a satisfactory extent when the RCL is mounted on a particularly bright objective lens, a convex lens component as in the present invention be placed at a position nearest to the object. Further, with a view to correcting the coma aberration and the longitudinal chromatic aberration, it is more desirable from the standpoint of achromatizing efficiency that positive, negative, and positive lens components are disposed alternately and in contiguity to each other to form the front lens group. Furthermore, in the ultrathin RCL as that of the present invention, freedom in correcting the aberrations is very limited; hence there has so far existed no satisfactory lens component with good optical performance. According to the present invention, however, those astigmatic difference, annular spherical aberration, and chromatic aberration of light rays on and outside the optical axis can be favorably rectified by use of glass material having a considerably high refractive index for at least one of the negative lens components in the front and rear lens groups of the RCL. A more desirable condition for this purpose is as follows:

$$n_- > 1.82 \qquad (4)$$

$$\nu_- > 35 \qquad (5)$$

(where: $n_-$ denotes the refractive index of the negative lens component which has the highest refractive index in the RCL; and $\nu_-$ represents the Abbé number of the negative lens component which has the lowest Abbé number in the RCL).

The conditional expression (4) is desirable for correcting the Petzval sum and the astigmatic difference. When these expressions are applied to the negative lens component $L_2$ in the front lens group, the annular spherical aberration which tends to occur by the negative lens component when the lens system is made to have a large aperture ratio and a thin thickness can be satisfactorily corrected. Use of those materials outside the conditions of the expressions (4) and (5) for the negative lens component ($L_2$) in the front group of the RCL makes it impossible to correct the annular spherical aberration, the Petzval sum, the astigmatic difference, and the chromatic difference of light rays on the optical axis. Also, when these expressions are not applied to the negative lens component $L_4$ in the rear lens group, correction of the astigmatic difference and the lateral chromatic aberration becomes undesirably difficult.

It has also been well known that the smaller and lighter the RCL is, the greater becomes its functionality as an interchangeable lens, and its operability is good. However, since this kind of RCL is made up of a lens system having a strong negative refractive power, it tends to have a large negative Petzval sum. As the consequence of this, the smaller the negative lens system is made in size, the more substantial this tendency appears. On account of this, the astigmatic difference becomes large, and the simultaneous correction of the annular spherical aberration and both longitudinal and lateral chromatic aberrations becomes more and more difficult. To avoid such difficulties, the present invention makes it desirable to use, in the front lens group, a glass material of high refractive index ($n_2 > 1.75$) and low dispersion ($\nu_2 > 40$) for the negative lens component $L_2$, and a glass material of low refractive index ($n_1 < 1.65$, $n_3 < 1.65$) and high dispersion ($\nu_1 < 40$, $\nu_3 < 40$) for the positive lens components $L_1$ and $L_3$, while, in the rear lens group having a negative refractive power, a glass material having a high refractive index ($n_4 > 1.82$) and a low dispersion ($\nu_4 > 35$) for the negative lens component $L_4$, and a glass material having a low refractive index ($n_5 < 1.56$) and a low dispersion ($\nu_5 > 44$) for the positive lens component $L_5$ to be provided at the image side of the negative lens $L_4$ as the case may be.

The positive lens component of the RCL nearest to the object is one with its surface having a greater curvature facing to the side of the image. It is desirable that this positive lens satisfy the following condition:

$$-1.7 < q_1 < -0.2 \quad (6)$$

(where: $q_1$ is a shape factor of the positive lens component which is defined as:

$$q_1 = \frac{r_t + r_s}{r_t - r_s},$$

$r_s$ being a radius of curvature of the lens surface to the side of the object, and $r_t$ being a radius of curvature of the same to the side of the image). When the shape factor is below the lower limit of this conditional expression (6), the object lens and the RCL tend to readily undergo mechanical interference, which is not desirable. In addition, the astigmatic difference becomes undesirably excessive on the periphery of the image plane. When the shape factor exceeds the upper limit of the equation (6), the coma aberration becomes excessive on the periphery of the image plane, which is also not desirable.

In the following, explanations will be given to several preferred embodiment of the present invention. The first to third embodiments of the RCL according to the present invention are made up of five lens components, and the fourth embodiment thereof is of four lens components. These RCLs are highly compact in size, and have a large aperture ratio and high lens performance, in addition to their negative refractive power throughout the system.

In the first to third embodiments, the front lens group consists of a biconvex lens $L_1$ with its surface having a greater curvature facing to the image side, a biconcave negative lens $L_2$, and a biconvex lens $L_3$ with its surface having a greater curvature facing to the object side, all being disposed with an aerial interspace between them, while the rear lens group having a negative refractive power consists of a biconcave lens $L_4$ with its surface having a greater concavity facing to the object side and a positive lens $L_5$ with its surface having a greater curvature facing to the object side. The front lens group of the RCL according to the first and second embodiments has the negative refractive power, while the front lens group of the RCL in the third and fourth embodiments has the positive refractive power. Further, in the third embodiment, a highly refractive glass material is used for the negative lens, while a low refractive and low dispersion glass material for the positive lens $L_5$. The fourth embodiment consists of four-group, four-lens components, wherein the front lens group is of the same construction as that in other embodiments, while the rear lens group is composed of a negative meniscus lens $L_4$ alone with its surface having a greater concavity facing to the object side.

The RCL in both first and second embodiments has a magnification $\beta$ of 1.4 and is of the substantially same lens structure as that in other embodiments. As an example, there will be shown an instance of placing the RCL behind the first reference lens ML1 having a focal length f of 180 mm, an F-number of 2.8, and a total angle of view $2\omega$ of 13.7°.

Table 1 below indicates specifications of the first reference lens. This telescopic lens is the same as described in Japanese Laid-open patent application No. 55-163510 (corresponding to U.S. Pat. No. 4,338,001 issued to the assignee of the present invention). Tables 2 and 3 below indicate respectively the specifications of the first and second embodiments. The RCL of these embodiments should desirably be mounted on a lens selected from those telescopic and objective lens as having a large aperture ratio and an exit pupil at a relatively distant position from the image plane as the first reference lens ML1. It may, of course, be possible that a good and practical image forming capability can be obtained, even when the RCL is provided on other type of objective lenses than the above-mentioned.

FIG. 2 illustrates a layout of the lens system, wherein the RCL of the first embodiment is provided on the first reference lens ML1.

Figure 4:
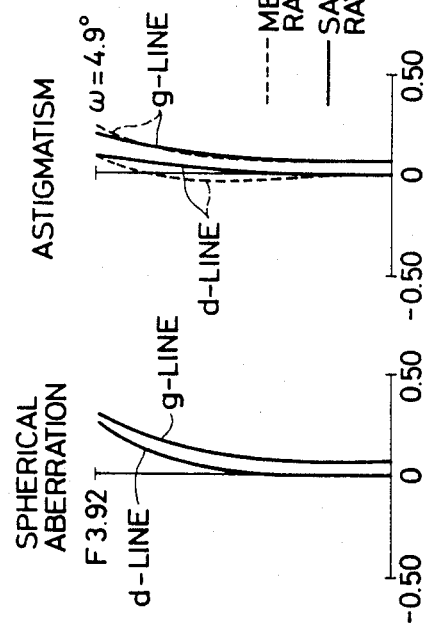

FIGS. 3 and 4 are the aberration diagrams when the RCLs of the first and second embodiments are provided on the first reference lens, whereupon the composite focal length f is 252.0 mm, the F-number is 3.92, and the total angle of view $2\omega$ is 9.8°.

Figure 5:
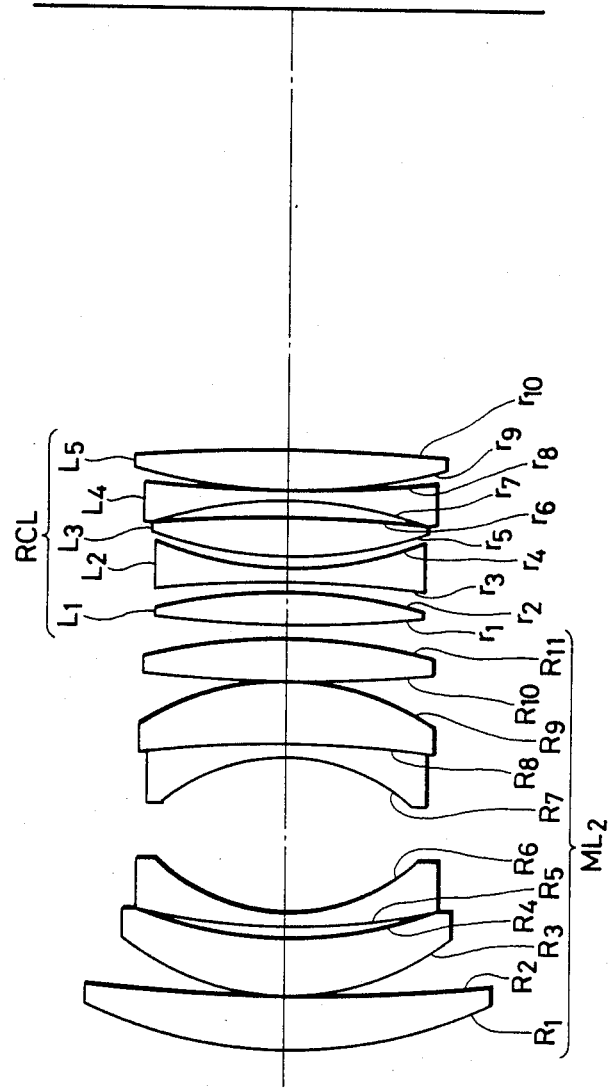
FIG. 5 is a layout of the lens components when the third embodiment of the RCL is provided on the second reference lens.
Figure 6:
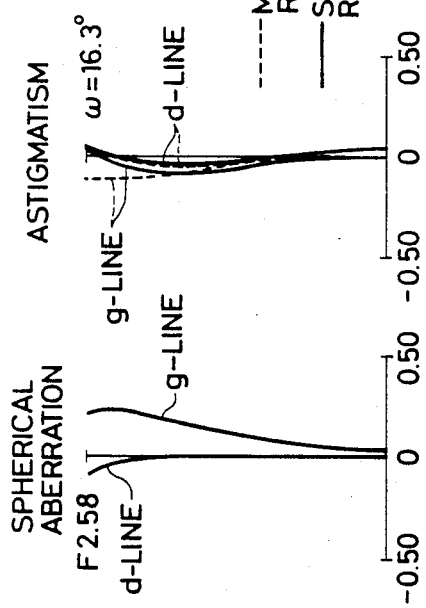
FIG. 6 shows aberration diagrams when the third embodiment of the RCL is mounted on the second reference lens.

FIG. 5 shows a lens layout when the RCL of the third embodiment is provided on the second reference lens ML2 having the focal length f of 51.6 mm and the F-number of 1.8. Table 4 below indicates the specifications of the second reference lens, which is a modified Gauss type photographic lens disclosed in Japanese Laid-open patent application No. 52-88020 (corresponding to U.S. Pat. No. 4,139,265 issued to the assignee of the present invention). Table 5 below lists the specifications of the RCL in the third embodiment, and FIG. 6 shows the aberration diagrams thereof. In this instance, after mounting the RCL of the third embodiment on the second reference lens ML2, the composite focal length f becomes 73.9109 mm, the F-number is 2.58, and the total angle of view $2\omega$ is 32.6°.

Figure 8:
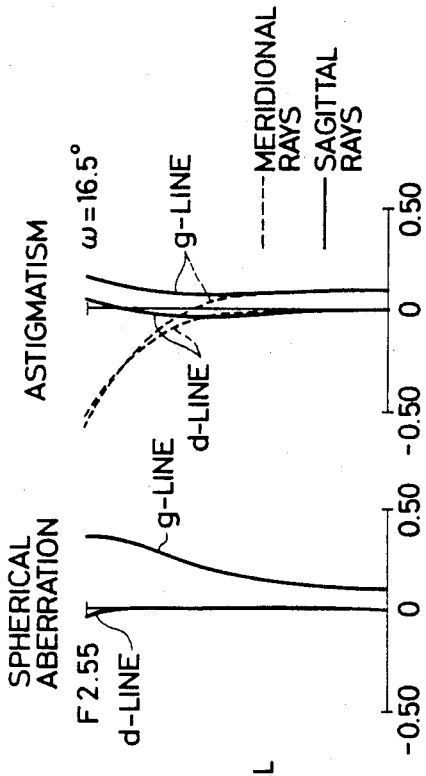
FIG. 8 is an aberration diagram when the fourth embodiment of the RCL is provided on the second reference lens.
Figure 7:
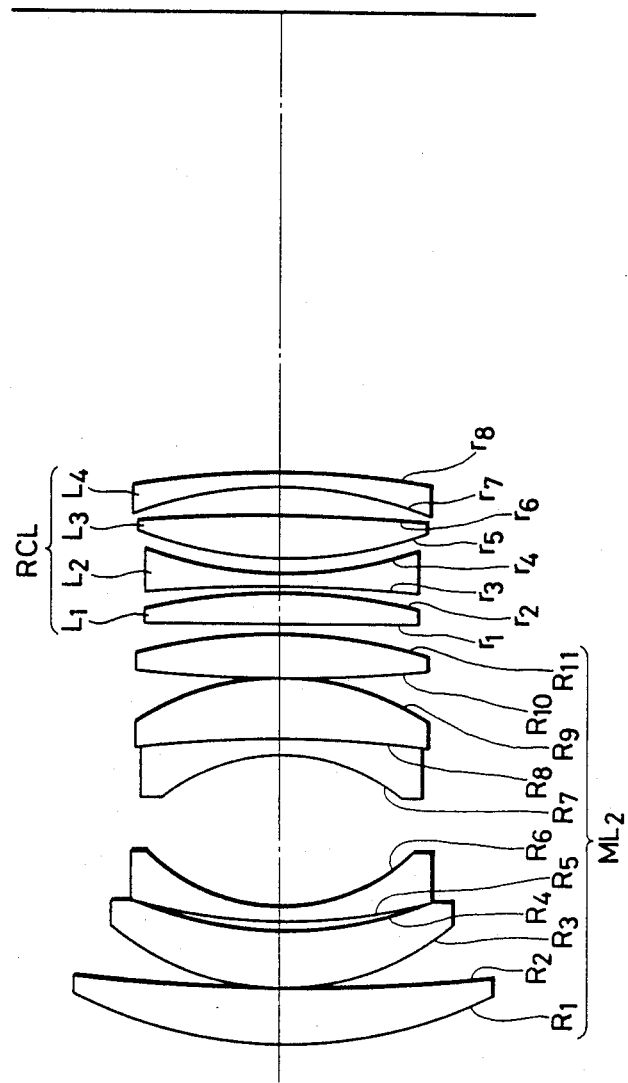
FIG. 7 is a layout of the lens components when the fourth embodiment of the RCL is mounted on the second reference lens.

FIG. 7 shows a lens layout diagram, wherein the RCL of the fourth embodiment is provided on the second reference lens ML2. Table 6 below indicates the specifications of the second reference lens, and FIG. 8 shows the aberration diagrams thereof. In this case, the composite focal length f is 72,9734 mm, the F-number is 2.55, and the total angle of view 2ω is 32.5°. The RCL of the fourth embodiment reduces the number of lens components and is more compact in size. The RCL of the third and fourth embodiments attains the highest image forming capability, for a portion corresponding to its expanded diameter ratio, in comparison with the first and second embodiments, when it is mounted on a reference lens having the position of its exit pupil somewhat closer to the image side, for a portion of increased aperture ratio, and it can still maintain favorable image forming capability for the practical use, even when it is used on all sorts of objective lenses.

In passing, note should be taken that, in the Tables below, reference letters R and r denote a radius of curvature of each lens surface; D and d designate respectively a central thickness and an aerial interspace of each lens; n is a refractive index of each lens; $\nu$ is an Abbé number of each lens, and a subscript numeral to each reference letter represents the sequence of the lens from the side of the object.

TABLE 1
First Reference Lens (ML 1)

$f = 180$  F-number = 2.8  $2\omega = 13.6°$

| | | | |
|---|---|---|---|
| $R_1 = 99.021$ | $D_1 = 11.5$ | $n_1 = 1.50032$ | $\nu_1 = 81.9$ |
| $R_2 = -140.839$ | $D_2 = 2.1$ | | |
| $R_3 = -138.056$ | $D_3 = 3.7$ | $n_2 = 1.74950$ | $\nu_2 = 35.0$ |
| $R_4 = 373.000$ | $D_4 = 6.3$ | | |
| $R_5 = 77.774$ | $D_5 = 9.2$ | $n_3 = 1.65844$ | $\nu_3 = 50.8$ |
| $R_6 = 240.000$ | $D_6 = 90.9$ | | |
| $R_7 = -35.500$ | $D_7 = 1.8$ | $n_4 = 1.51454$ | $\nu_4 = 54.6$ |
| $R_8 = -550.000$ | $D_8 = 0.5$ | | |
| $R_9 = 220.000$ | $D_9 = 5.0$ | $n_5 = 1.79668$ | $\nu_5 = 45.4$ |
| $R_{10} = -162.193$ | Bf = 41.2600 | | |

TABLE 2
(First Embodiment)

$\beta = 1.4$  $f_R = -104.8292$ $d_0 = -37.64194$

| | | | | |
|---|---|---|---|---|
| $r_1 = 110.088$ | $d_1 = 3.4$ | $n_1 = 1.59507$ | $\nu_1 = 35.5$ | $L_1$ |
| $r_2 = -37.390$ | $d_2 = 1.0$ | | | |
| $r_3 = -40.473$ | $d_3 = 1.0$ | $n_2 = 1.78797$ | $\nu_2 = 47.5$ | $L_2$ |
| $r_4 = 31.842$ | $d_4 = 1.0$ | | | |
| $r_5 = 35.163$ | $d_5 = 3.8$ | $n_3 = 1.59507$ | $\nu_3 = 35.5$ | $L_3$ |
| $r_6 = -132.889$ | $d_6 = 1.0$ | | | |
| $r_7 = -52.00$ | $d_7 = 1.0$ | $n_4 = 1.90265$ | $\nu_4 = 35.8$ | $L_4$ |
| $r_8 = 611.943$ | $d_8 = 0.2$ | | | |
| $r_9 = 50.800$ | $d_9 = 3.0$ | $n_5 = 1.49782$ | $\nu_5 = 82.3$ | $L_5$ |
| $r_{10} = 2442.404$ | Bf = 38.6208 | | | |

$\Sigma_d = 15.4$   $\dfrac{Bf}{-d_0} = 1.026$ $\dfrac{\Sigma_d}{-f_R} = 0.1469$   $q_1 = -0.493$

TABLE 3
(Second Embodiment)

$\beta = 1.4$  $f_R = -111.8457$ $d_0 = -37.63874$

| | | | | |
|---|---|---|---|---|
| $r_1 = 130.108$ | $d_1 = 3.4$ | $n_1 = 1.59507$ | $\nu_1 = 35.5$ | $L_1$ |
| $r_2 = -35.344$ | $d_2 = 1.0$ | | | |
| $r_3 = -38.314$ | $d_3 = 1.0$ | $n_2 = 1.78797$ | $\nu_2 = 47.5$ | $L_2$ |
| $r_4 = 28.774$ | $d_4 = 1.0$ | | | |
| $r_5 = 31.038$ | $d_5 = 3.8$ | $n_3 = 1.59507$ | $\nu_3 = 35.5$ | $L_3$ |
| $r_6 = -132.855$ | $d_6 = 1.0$ | | | |
| $r_7 = -50.864$ | $d_7 = 1.0$ | $n_4 = 1.90265$ | $\nu_4 = 35.8$ | $L_4$ |
| $r_8 = 535.743$ | $d_8 = 0.2$ | | | |
| $r_9 = 53.098$ | $d_9 = 3.0$ | $n_5 = 1.49782$ | $\nu_5 = 82.3$ | $L_5$ |
| $r_{10} = -192.027$ | Bf = 39.41941 | | | |

TABLE 3-continued
(Second Embodiment)

$\beta = 1.4$   $f_R = -111.8457$ $\Sigma_d = 15.4$   $\dfrac{Bf}{-d_0} = 1.0473$ $\dfrac{\Sigma_d}{-f_R} = 0.1379$   $q_1 = -0.573$

TABLE 4
Second Reference Lens (ML 2)

$f = 51.6$  F-number = 1.8

| | | | |
|---|---|---|---|
| $R_1 = 41.000$ | $D_1 = 4.6$ | $n_1 = 1.79631$ | $\nu_1 = 40.8$ |
| $R_2 = 197.900$ | $D_2 = 0.1$ | | |
| $R_3 = 21.400$ | $D_3 = 4.7$ | $n_2 = 1.78797$ | $\nu_2 = 47.5$ |
| $R_4 = 32.600$ | $D_4 = 1.0$ | | |
| $R_5 = 51.000$ | $D_5 = 1.1$ | $n_3 = 1.74000$ | $\nu_3 = 28.2$ |
| $R_6 = 16.200$ | $D_6 = 13.1$ | | |
| $R_7 = -16.500$ | $D_7 = 1.3$ | $n_4 = 1.74000$ | $\nu_4 = 28.2$ |
| $R_8 = -100.000$ | $D_8 = 5.4$ | $n_5 = 1.74443$ | $\nu_5 = 49.5$ |
| $R_9 = -20.640$ | $D_9 = 0.1$ | | |
| $R_{10} = -204.300$ | $D_{10} = 3.45$ | $n_6 = 1.79631$ | $\nu_6 = 40.8$ |
| $R_{11} = -49.650$ | Bf = 37.60538 | | |

TABLE 5
(Third Embodiment)

$\beta = 1.4324$   $f_R = -92.2451$ $d_0 = -36.40544$

| | | | | |
|---|---|---|---|---|
| $r_1 = 105.216$ | $d_1 = 2.7$ | $n_1 = 1.59507$ | $\nu_1 = 35.5$ | $L_1$ |
| $r_2 = -52.031$ | $d_2 = 1.0$ | | | |
| $r_3 = -83.298$ | $d_3 = 1.0$ | $n_2 = 1.78797$ | $\nu_2 = 47.5$ | $L_2$ |
| $r_4 = 29.263$ | $d_4 = 1.0$ | | | |
| $r_5 = 32.766$ | $d_5 = 3.3$ | $n_3 = 1.59507$ | $\nu_3 = 35.5$ | $L_3$ |
| $r_6 = -195.060$ | $d_6 = 1.5$ | | | |
| $r_7 = -40.120$ | $d_7 = 1.0$ | $n_4 = 1.90265$ | $\nu_4 = 35.8$ | $L_4$ |
| $r_8 = 414.484$ | $d_8 = 0.2$ | | | |
| $r_9 = 59.129$ | $d_9 = 3.0$ | $n_5 = 1.53172$ | $\nu_5$ 32 49.1 | $L_5$ |
| $r_{10} = -292.539$ | Bf = 37.6941 | | | |

$\Sigma_d = 14.7$   $\dfrac{Bf}{-d_0} = 1.0354$ $\dfrac{\Sigma_d}{-f_R} = 0.1594$   $q_1 = -0.338$

TABLE 6
(Fourth Embodiment)

$\beta = 1.4142$   $f_R = -95.0774$ $d_0 = -36.60543$

| | | | | |
|---|---|---|---|---|
| $r_1 = \infty$ | $d_1 = 2.7$ | $n_1 = 1.59507$ | $\nu_1 = 35.5$ | $L_1$ |
| $r_2 = -45.265$ | $d_2 = 0.5$ | | | |
| $r_3 = -120.630$ | $d_3 = 1.0$ | $n_2 = 1.84042$ | $\nu_2 = 43.3$ | $L_2$ |
| $r_4 = 33.259$ | $d_4 = 1.0$ | | | |
| $r_5 = 29.167$ | $d_5 = 4.2$ | $n_3 = 1.59507$ | $\nu_3 = 35.5$ | $L_3$ |
| $r_6 = -132.889$ | $d_6 = 2.2$ | | | |
| $r_7 = -31.846$ | $d_7 = 1.3$ | $n_4 = 1.90265$ | $\nu_4 = 35.8$ | $L_4$ |
| $r_8 = -80.547$ | Bf = 38.8895 | | | |

$\Sigma_d = 12.9$   $\dfrac{Bf}{-d_0} = 1.0624$ $\dfrac{\Sigma_d}{-f_R} = 0.1356$   $q_1 = -1.0$ From each of the aberration diagrams in FIGS. 3, 4, 6 and 8, it will be seen that the RCL according to the present invention is highly compact in size, and yet is able to maintain excellent image forming capability, while possessing a sufficiently long back focus for a single lens reflex camera, even when it is provided on an objective lens with the exit pupil thereof being positioned at a relatively far distance from the image plane, or on an objective lens having a relatively short back focus and a large aperture ratio. It is particularly worthy of note that the RCL according to the present invention can be used to a satisfactory extent with an objective lens having a short back focus for use in the single lens reflex camera, which enhances versatility of the RCL, and proves to be highly useful.

I claim:

1. A rear conversion lens for a single lens reflex camera capable of maintaining excellent image forming performance, even if it is mounted on an objective lens having a relatively short back focus, a large aperture ratio, and an exit pupil which is at a relatively distant position from the image plane, comprising:
   a front lens unit including, in the sequence from the object side, a positive lens, a negative biconcave lens and a positive lens; and
   a rear lens unit including a negative lens with its surface of sharper curvature facing the object side, and further satisfying the following conditions:

$$0.1 < \frac{\Sigma_d}{-f_R} < 0.2$$

$$0.95 < \frac{B_f}{-d_0} < 1.2$$

$$n_- > 1.82$$

$$\nu_- > 35$$

where, $\Sigma_d$ denotes the distance between the frontmost surface and the rearmost surface of said rear conversion lens; $f_R$ represents the focal length of said rear conversion lens; $B_f$ is the back focus when said rear conversion lens is mounted on the objective lens; $d_0$ designates the distance between the frontmost surface of said rear conversion lens and the rear focal point of said objective lens; $n_-$ denotes the refractive index of the negative lens which has the highest refractive index in said rear conversion lens; and $\nu_-$ represents the Abbe number of the negative lens which has the lowest Abbe number in the rear conversion lens.

2. The rear conversion lens as set forth in claim 1, wherein said positive lens in said front lens unit nearest to the object satisfies the following condition:

$$-1.7 < q_1 < -0.2 \quad (6)$$

(where: $q_1$ represents a shape factor of the positive lens, which is defined as $$q_1 = \frac{r_2 + r_1}{r_2 - r_1},$$

$r_1$ being a radius of curvature of the lens surface to the side of the object, and $r_2$ being a radius of curvature of the lens surface to the side of the image).

3. The rear conversion lens at set forth in claim 2, wherein said lens satisfies the following conditions:

| | |
|---|---|
| $n_1 < 1.65$, | $\nu_1 < 40$ |
| $n_2 < 1.75$, | $\nu_2 > 40$ |
| $n_3 < 1.65$, | $\nu_3 < 40$ |
| $n_4 > 1.82$, | $\nu_4 > 35$ |

(where: $n_1$, $n_3$ and $\nu_1$, $\nu_3$ respectively denote the refractive indexes and the Abbé numbers of the two positive lenses in said front lens unit; $n_2$ and $\nu_2$ represent respectively the refractive index and the Abbé number of the negative lens in said front lens unit, and $n_4$ and $\nu_4$ respectively designate the refractive index and the Abbé number of the negative lens in the rear lens unit).

4. The rear conversion lens as set forth in claim 3, wherein said lens satisfies the following conditions:

| $\beta = 1.4142$ | | $f_R = -95.0774$ | | |
|---|---|---|---|---|
| | $d_0 = -36.60543$ | | | |
| $r_1 = \infty$ | $d_1 = 2.7$ | $n_1 = 1.59507$ | $\nu_1 = 35.5$ | $L_1$ |
| $r_2 = -45.265$ | $d_2 = 0.5$ | | | |
| $r_3 = -120.630$ | $d_3 = 1.0$ | $n_2 = 1.84042$ | $\nu_2 = 43.3$ | $L_2$ |
| $r_4 = 33.259$ | $d_4 = 1.0$ | | | |
| $r_5 = 29.167$ | $d_5 = 4.2$ | $n_3 = 1.59507$ | $\nu_3 = 35.5$ | $L_3$ |
| $r_6 = -132.889$ | $d_6 = 2.2$ | | | |
| $r_7 = -31.846$ | $d_7 = 1.3$ | $n_4 = 1.90265$ | $\nu_4 = 35.8$ | $L_4$ |
| $r_8 = -80.547$ | $B_f = 38.8895$ | | | |

$$\Sigma_d = 12.9 \qquad \frac{B_f}{-d_0} = 1.0624$$

$$\frac{\Sigma_d}{-f_R} = 0.1356 \qquad q_1 = -1.0$$

(where: $\beta$ denotes magnification of said rear conversion lens; $f_R$ represents focal length of said rear coversion lens; $d_0$ indicates a distance between the frontmost surface of the rear conversion lens and the focal point at the rear side of said objective lens; $r_1$ to $r_8$ are respectively the radius of curvature of the lens components; $d_1$ to $d_7$ are respectively the central thickness and air spaces of the successive lens components; $n_1$ to $n_4$ the refractive index of the lens components; $\nu_1$ to $\nu_4$ the Abbé number of the components lenses; $L_1$ a positive lens with its surface having a greater curvature faced to the image side, $L_2$ is a negative biconcave lens, and $L_3$ is a positive lens with its surface having a greater curvature facing to the object side, all these three lenses constituting the front lens unit; and $L_4$ is a negative lens constituting the rear lens unit; $B_f$ is a back focus when said rear conversion lens is mounted on the objective lens; $\Sigma_d$ denotes a distance between the frontmost surface and the rearmost surface of said rear conversion lens; and $q_1$ represents a shape factor of the positive lens, which is defined as $$q_1 = \frac{r_t + r_s}{r_t - r_s},$$

$r_s$ being a radius of curvature of the lens surface to the side of the object, and $r_t$ being a radius of curvature of the lens surface to the side of the image).

5. The rear conversion lens as set forth in claim 3, wherein said rear lens unit further includes a positive lens to the image side of said negative lens.

6. The rear conversion lens as set forth in claim 5, wherein said positive lens in said rear lens unit satisfies the following condition:

$$n_5 < 1.56, \quad \nu_5 > 44$$

(where: $n_5$ is refractive index, and $\nu_5$ is Abbé number of said positive lens).

7. The rear conversion lens as set forth in claim 6, wherein said lens satisfies the following conditions:

| $\beta = 1.4$ | | $f_R = -104.8292$ | | |
|---|---|---|---|---|
| | $d_0 = -37.64194$ | | | |
| $r_1 = 110.088$ | $d_1 = 3.4$ | $n_1 = 1.59507$ | $\nu_1 = 35.5$ | $L_1$ |
| $r_2 = -37.390$ | $d_2 = 1.0$ | | | |
| $r_3 = -40.473$ | $d_3 = 1.0$ | $n_2 = 1.78797$ | $\nu_2 = 47.5$ | $L_2$ |
| $r_4 = 31.842$ | $d_4 = 1.0$ | | | |
| $r_5 = 35.163$ | $d_5 = 3.8$ | $n_3 = 1.59507$ | $\nu_3 = 35.5$ | $L_3$ |
| $r_6 = -132.889$ | $d_6 = 1.0$ | | | |
| $r_7 = -52.00$ | $d_7 = 1.0$ | $n_4 = 1.90265$ | $\nu_4 = 35.8$ | $L_4$ |
| $r_8 = 611.943$ | $d_8 = 0.2$ | | | |
| $r_9 = 50.800$ | $d_9 = 3.0$ | $n_5 = 1.49782$ | $\nu_5 = 82.3$ | $L_5$ |
| $r_{10} = 2442.404$ | $Bf = 38.6208$ | | | |

$$\Sigma_d = 15.4 \qquad \frac{Bf}{-d_0} = 1.026$$

$$\frac{\Sigma_d}{-f_R} = 0.1469 \qquad q_1 = -0.493$$

(where: $\beta$ denotes magnification of said rear conversion lens; $f_R$ represents focal length of said rear conversion lens; $d_0$ indicates a distance between the frontmost surface of the rear conversion and the focal point at the rear side of said objective lens; $r_1$ to $r_{10}$ are respectively the radius of curvature of the lens components; $d_1$ to $d_9$ are respectively the central thickness of the lens components; $n_1$ to $n_5$ the refractive index of the lens components; $\nu_1$ to $\nu_5$ the Abbé number of the components lenses; $L_1$ a positive lens with its surface having a greater curvature faced to the side of the image, $L_2$ is a negative biconcave lens, and $L_3$ is a positive lens with its surface having a greater curvature faced to the side of the object, all these three lenses constituting the front lens unit; $L_4$ is a negative lens, and $L_5$ is a positive lens, these lenses constituting the rear lens unit; $Bf$ is a back focus when said rear conversion lens is mounted on the objective lens; $\Sigma_d$ denotes a distance between the frontmost surface and the rearmost surface of said rear conversion lens; and $q_1$ represents a shape factor of the positive lens, which is defined as $$q_1 = \frac{r_t + r_s}{r_t - r_s},$$

$r_s$ being a radius of curvature of the lens surface to the side of the object, and $r_t$ being a radius of curvature of the lens surface to the side of the image).

8. The rear conversion lens as set forth in claim 6, wherein said lens satisfies the following conditions:

| $\beta = 1.4$ | | $f_R = -111.8457$ | | |
|---|---|---|---|---|
| | $d_0 = -37.63874$ | | | |
| $r_1 = 130.108$ | $d_1 = 3.4$ | $n_1 = 1.59507$ | $\nu_1 = 35.5$ | $L_1$ |
| $r_2 = -35.344$ | $d_2 = 1.0$ | | | |
| $r_3 = -38.314$ | $d_3 = 1.0$ | $n_2 = 1.78797$ | $\nu_2 = 47.5$ | $L_2$ |
| $r_4 = 28.774$ | $d_4 = 1.0$ | | | |
| $r_5 = 31.038$ | $d_5 = 3.8$ | $n_3 = 1.59507$ | $\nu_3 = 35.5$ | $L_3$ |
| $r_6 = -132.855$ | $d_6 = 1.0$ | | | |
| $r_7 = -50.864$ | $d_7 = 1.0$ | $n_4 = 1.90265$ | $\nu_4 = 35.8$ | $L_4$ |
| $r_8 = 535.743$ | $d_8 = 0.2$ | | | |
| $r_9 = 53.098$ | $d_9 = 3.0$ | $n_5 = 1.49782$ | $\nu_5 = 82.3$ | $L_5$ |
| $r_{10} = -192.027$ | $Bf = 39.41941$ | | | |

$$\Sigma_d = 15.4 \qquad \frac{Bf}{-d_0} = 1.0473$$

-continued

| $\beta = 1.4$ | $f_R = -111.8457$ |
|---|---|

$$\frac{\Sigma_d}{-f_R} = 0.1379 \qquad q_1 = -0.573$$

(where: $\beta$ denotes magnification of said rear conversion lens; $f_R$ represents focal length of said rear conversion lens; $d_0$ indicates a distance between the frontmost surface of the rear conversion lens and the focal point at the rear side of said objective lens; $r_1$ to $r_{10}$ are respectively the radius of curvature of the lens components; $d_1$ to $d_9$ are respectively the central thickness of the lens components; $n_1$ to $n_5$ the refractive index of the lens components; $\nu_1$ to $\nu_5$ the Abbé number of the component lenses; $L_1$ a positive lens with its surface having a greater curvature faced to the side of the image, $L_2$ is a negative biconcave lens, and $L_3$ is a positive lens with its surface having a greater curvature faced to the side of the object, all these three lenses constituting the front lens unit; $L_4$ is a negative lens, and $L_5$ is a positive lens, these lenses constituting the rear lens unit; $Bf$ is a back focus when said rear conversion lens is mounted on the objective lens; $\Sigma_d$ denotes a distance between the frontmost surface and the rearmost surface of said rear conversion lens; and $q_1$ represents a shape factor of the positive lens, which is defined as $$q_1 = \frac{r_t + r_s}{r_t - r_s},$$

$r_s$ being a radius of curvature of the lens surface to the side of the object, and $r_t$ being a radius of curvature of the lens surface to the side of the image).

9. The rear conversion lens as set forth in claim 6, wherein said lens satisfies the following conditions;

| $\beta = 1.4324$ | | $f_R = -92.2451$ | | |
|---|---|---|---|---|
| | $d_0 = -36.40544$ | | | |
| $r_1 = 105.216$ | $d_1 = 2.7$ | $n_1 = 1.59507$ | $\nu_1 = 35.5$ | $L_1$ |
| $r_2 = 52.031$ | $d_2 = 1.0$ | | | |
| $r_3 = -83.298$ | $d_3 = 1.0$ | $n_2 = 1.78797$ | $\nu_2 = 47.5$ | $L_2$ |
| $r_4 = 29.263$ | $d_4 = 1.0$ | | | |
| $r_5 = 32.766$ | $d_5 = 3.3$ | $n_3 = 1.59507$ | $\nu_3 = 35.5$ | $L_3$ |
| $r_6 = -195.060$ | $d_6 = 1.5$ | | | |
| $r_7 = -40.120$ | $d_7 = 1.0$ | $n_4 = 1.90265$ | $\nu_4 = 35.8$ | $L_4$ |
| $r_8 = 414.484$ | $d_8 = 0.2$ | | | |
| $r_9 = 59.129$ | $d_9 = 3.0$ | $n_5 = 1.53172$ | $\nu_5 = 49.1$ | $L_5$ |
| $r_{10} = -292.539$ | $Bf = 37.6941$ | | | |

$$\Sigma_d = 14.7 \qquad \frac{Bf}{-d_0} = 1.0354$$

$$\frac{\Sigma_d}{-f_R} = 0.1594 \qquad q_1 = -0.338$$

(where: $\beta$ denotes magnification of said rear conversion lens; $f_R$ represents focal length of said rear conversion lens; $d_0$ indicates a distance between the frontmost surface of the rear coversion lens and the focal point at the rear side of said objective lens; $r_1$ to $r_{10}$ are respectively the radius of curvature of the lens components; $d_1$ to $d_9$ are respectively the central thickness of the lens components; $n_1$ to $n_5$ the refractive index of the lens components; $\nu_1$ to $\nu_5$ the Abbé number of the component lenses; $L_1$ a positive lens with its surface having a greater curvature faced to the side of the image, $L_2$ is a negative biconcave lens, and $L_3$ is a positive lens with its surface having a greater curvature faced to the side of the object, all these three lenses constituting the front lens unit; and L₄ is a negative lens, and L₅ is a positive lens, these lenses constituting the rear lens unit; $B_f$ is a back focus when said rear conversion lens is mounted on the objective lens; $\Sigma_d$ denotes a distance between the frontmost surface and the rearmost surface of said rear conversion lens; and $q_1$ represents a shape factor of the positive lens, which is defined as $$q_1 = \frac{r_t + r_s}{r_t - r_s},$$

$r_s$ being a radius of curvature of the lens surface to the side of the object, and $r_t$ being a radius of curvature of the lens surface to the side of the image).

10. A compact rear conversion lens for a single lens reflex camera, said lens being removably disposed between an objective lens and a camera body to provide a composite focal length longer than the focal length of said objective lens, said compact rear conversion lens being capable of maintaining excellent image forming performance, even if it is mounted on an objective lens having a relatively short back focus, a large aperture ratio, and an exit pupil which is at a relatively distant position from the image plane, consisting of, in order from the object side:

a first positive lens, a negative biconcave lens, a second positive lens, a negative meniscus lens convex to the image side, and further satisfying the following conditions:

$$0.1 < \frac{\Sigma_d}{-f_R} < 0.2 \tag{1}$$

$$0.95 < \frac{B_f}{-d_0} < 1.2 \tag{2}$$

(where: $\Sigma_d$ denotes the distance between the frontmost surface and the rearmost surface of said rear conversion lens; $f_R$ represents the focal length of said rear conversion lens; $B_f$ is the back focus when said rear conversion lens is mounted on the objective lens; and $d_0$ designates the distance between the frontmost surface of said rear conversion lens and the rear focal point of said objective lens).

11. A compact rear conversion lens according to claim 10, wherein said first positive lens has a surface of sharper curvature facing the image side, and said second positive lens has a surface of sharper curvature facing the object side.

* * * * *